United States Patent [19]

Zamora

[11] Patent Number: 4,862,408
[45] Date of Patent: Aug. 29, 1989

[54] PARADIGM-BASED MORPHOLOGICAL TEXT ANALYSIS FOR NATURAL LANGUAGES

[75] Inventor: Antonio Zamora, Chevy Chase, Md.

[73] Assignee: International Business Machines Corporation, Armonk, N.Y.

[21] Appl. No.: 28,437

[22] Filed: Mar. 20, 1987

[51] Int. Cl.[4] .............................................. G06F 15/20
[52] U.S. Cl. ..................................... 364/900; 364/419
[58] Field of Search ... 364/200 MS File, 900 MS File, 364/419; 382/34, 40, 57; 400/63

[56] References Cited

U.S. PATENT DOCUMENTS

| | | | |
|---|---|---|---|
| 4,328,562 | 5/1982 | Hashimoto et al. | 364/900 |
| 4,339,806 | 7/1982 | Yoshida | 364/900 |
| 4,420,816 | 12/1983 | Yoshida | 364/900 |
| 4,420,817 | 12/1983 | Yoshida | 364/900 |
| 4,439,836 | 3/1984 | Yoshida | 364/900 |
| 4,495,566 | 1/1985 | Dickinson et al. | 364/200 |
| 4,499,553 | 2/1985 | Dickinson et al. | 364/900 |
| 4,541,069 | 9/1985 | Kanou et al. | 364/900 |
| 4,594,686 | 6/1986 | Yoshida | 364/900 |
| 4,641,264 | 2/1987 | Nitta et al. | 364/900 |

OTHER PUBLICATIONS

Patent Applic. Ser. No. 853,490, filed 4/18/86, pp. 1–37, "Linguistic Analysis Method and Apparatus", B. W. Knystautas et al.

Primary Examiner—Thomas M. Heckler
Attorney, Agent, or Firm—John E. Hoel

[57] ABSTRACT

A computer method is disclosed for analyzing text by employing a model known as a paradigm, that provides all the inflectional forms of a word. A file structure is created consisting of two components, a list of words (a dictionary), each word of which is associated with a set of paradigm references, and the file of paradigms consisting of grammatical categories paired with their corresponding ending or affix portions (known as the desinence) specifying tense, mood, number, gender or other linguistic attribute. A computer method is disclosed for generating the file structure of the dictionary by generating all forms of the words from a list of standard forms of the words (known as the lemma) which is generally the infinitive of a verb or the singular form of a noun, the lemmas being generated with their corresponding paradigms.

5 Claims, 6 Drawing Sheets

| paradigm: V45 | example: park |
|---|---|
| * IMPERSONAL<br>infinitive<br>pres. participle<br>past participle | — (lemma)<br>ing<br>ed |
| * PRESENT TENSE<br>pres1<br>pres2<br>pres3<br>pres4<br>pres5<br>pres6 | —<br>—<br>s<br>—<br>—<br>— |
| * PAST TENSE<br>pasi1<br>pasi2<br>pasi3<br>pasi4<br>pasi5<br>pasi6 | ed<br>ed<br>ed<br>ed<br>ed<br>ed |

| paradigm: N27 | example: book |
|---|---|
| singular<br>plural | — (lemma)<br>s |

FIG. 4

| paradigm: V4c | example: find |
|---|---|
| * IMPERSONAL<br>infinitive<br>pres. participle<br>past participle | ind    (lemma)<br>inding<br>ound |
| * PRESENT TENSE<br>pres1<br>pres2<br>pres3<br>pres4<br>pres5<br>pres6 | ind<br>ind<br>inds<br>ind<br>ind<br>ind |
| * PAST TENSE<br>pasi1<br>pasi2<br>pasi3<br>pasi4<br>pasi5<br>pasi6 | ound<br>ound<br>ound<br>ound<br>ound<br>ound |

FIG. 6

| paradigma: N04 | ejemplo: amo |
|---|---|
| msing<br>mplur<br>fsing<br>fplur | o<br>os<br>a<br>as |

FIG. 5

| paradigma: V01 | ejemplo: amar | |
|---|---|---|
| \* FORMAS NO PERSONALES | | |
| infinitivo | ar | (lemma) |
| gerundio | ando | |
| participio | ado | |

| \* MODO INDICATIVO | |
|---|---|
| \* presente | |
| pres1 | o |
| pres2 | as |
| pres3 | a |
| pres4 | amos |
| pres5 | áis |
| pres6 | an |
| \* pretérito imperfecto | |
| pasi1 | aba |
| pasi2 | abas |
| pasi3 | aba |
| pasi4 | ábamos |
| pasi5 | abais |
| pasi6 | aban |
| \* pretérito perfecto simple | |
| pasp1 | é |
| pasp2 | aste |
| pasp3 | ó |
| pasp4 | amos |
| pasp5 | asteis |
| pasp6 | aron |
| \* futuro | |
| futu1 | aré |
| futu2 | arás |
| futu3 | ará |
| futu4 | aremos |
| futu5 | aréis |
| futu6 | arán |
| \* condicional | |
| cond1 | aría |
| cond2 | arías |
| cond3 | aría |
| cond4 | aríamos |
| cond5 | aríais |
| cond6 | arían |

| \* MODO SUBJUNTIVO | |
|---|---|
| \* presente | |
| spre1 | e |
| spre2 | es |
| spre3 | e |
| spre4 | emos |
| spre5 | éis |
| spre6 | en |
| \* pretérito imperfecto | |
| spai1 | ara, ase |
| spai2 | aras, ases |
| spai3 | ara, ase |
| spai4 | áremos, ásemos |
| spai5 | arais, aseis |
| spai6 | aran, asen |
| \* futuro | |
| sfut1 | are |
| sfut2 | ares |
| sfut3 | are |
| sfut4 | áremos |
| sfut5 | areis |
| sfut6 | aren |

| \* MODO IMPERATIVO | |
|---|---|
| impe1 | - |
| impe2 | a |
| impe3 | e |
| impe4 | emos |
| impe5 | ad |
| impe6 | en |

FIG. 8

| paradigm: V56 | example: talk |
|---|---|
| *ENDINGS<br>          (lemma)<br>ed<br>ing<br>s | *GRAMMATICAL CLASSES<br>1,2,4,5,6,infinitive<br>past,past participle<br>present participle<br>3 |

FIG. 9

| paradigm: V57 | example: speed |
|---|---|
| *ENDINGS<br>d        (lemma)<br>ded<br>ding<br>ds | *GRAMMATICAL CLASSES<br>1,2,4,5,6,infinitive<br>past,past participle<br>present participle<br>3 |

PARADIGM-BASED MORPHOLOGICAL TEXT ANALYSIS FOR NATURAL LANGUAGES

BACKGROUND OF THE INVENTION

1. Technical Field

The invention disclosed broadly relates to data processing and more particularly relates to linguistic applications in data processing.

2. Related Patent Applications

The following related patents and applications are incorporated herein by reference:

U.S. patent application by B. Knystautas, et al. entitled "Linguistic Analysis Method and Apparatus," Ser. No. 853,490, filed Apr. 18, 1986, abandoned, assigned to IBM Corporation.

U.S. Pat. No. 4,328,561 by D. B. Convis, et al. entitled "Alpha Content Match Prescan Method for Automatic Spelling Error Correction," assigned to the IBM Corporation.

U.S. Pat. No. 4,355,371 by D. B. Convis, et al. entitled "Instantaneous Alpha Content Prescan Method for Automatic Spelling Error Correction," assigned to the IBM Corporation.

3. Background Art

Text processing and word processing systems have been developed for both stand-alone applications and distributed processing applications. The terms text processing and word processing will be used interchangeably herein to refer to data processing systems primarily used for the creation, editing, communication, and/or printing of alphanumeric character strings composing written text. A particular distributed processing system for word processing is disclosed in the copending U.S. patent application Ser. No. 781,862 filed Sept. 30, 1985 entitled "Multilingual Processing for Screen Image Build and Command Decode in a Word Processor, with Full Command, Message and Help Support," by K. W. Borgendale, et al., now U.S. Pat. No. 4,731,735, assigned to IBM Corporation. The figures and specification of the Borgendale, et al. patent application are incorporated herein by reference, as an example of a host system within which the subject invention herein can be applied.

The morphological text analysis invention disclosed herein finds application in the parser for natural language text which is described in the copending U.S. patent application Ser. No. 924,670 filed Oct. 29, 1986, by Antonio Zamora, et al., assigned to IBM Corporation. The figures and specification of the Zamora, et al. patent application are incorporated herein by reference as an example of a larger scale language processing application which the subject invention herein can be applied.

Glossary:

This description uses specialized linguistic terminology; the most common terms are defined here:

DESINENCE—An ending or affix added to a word and which specifies tense, mood, number, gender, or other linguistic attribute.

LEMMA—The standard form of a word which is used in a dictionary (generally the infinitive of a verb or the singular form of a noun).

MORPHOLOGY—The study of word formation in a language including inflections, derivations, and formation of compounds.

PARADIGM—A model that provides all the inflectional forms of a word (conjugations or declension).

STEM—A portion of a word that does not change and to which affixes are added to form words. The stem itself is not necessarily a word.

Morphology is an important aspect of the study of languages which has many practical applications in data processing. Of particular relevance to this invention is the study of the alteration of words by the use of regular changes. For many centuries the study of romance languages (Spanish, French, Italian, etc.) and other Indo-European languages has placed emphasis on the "stem" and "desinence" of verbs. The "stem" is the portion of the verb that remains invariant during conjugation whereas the "desinence" is the portion that changes according to some paradigm or pattern. In English, the number of desinences of a verb are relatively few ("-ed," "-s," and "-ing" for the past tense, the third person, and the present participle, respectively), but in European languages there may be 50 or more verb forms. Although classification schemes have been devised for natural languages, most are incomplete and not systematic enough for use in computer-based systems for a variety of languages.

A prior art technique associates ending table references with the entries of an existing dictionary and is able to identify the grammatical form of an input text word and its invariant root form. However, the technique does not provide a mechanism for using the ending tables as part of the dictionary structure, and this results in unnecessary redundancy of data which does not yield a very compact representation. Another consequence of the organization of the data is that an additional access is required to find the ending table associated with each dictionary word.

A second prior art technique, U.S. Pat. No. 4,342,085 entitled "Stem Processing for Data Reduction in a Dictionary Storage File," assigned to IBM Corporation, provides a compact dictionary representation by encoding common prefixes and suffixes, but the encoding mechanism is only a compacting scheme and does not provide any linguistic information.

OBJECTS OF THE INVENTION

It is therefore an object of the invention to provide a mechanism for classifying natural language text and for generating word forms that can be used in a variety of text processing applications and which can be applied to many natural languages.

It is another object of the invention to provide an improved morphological analysis system which is more compact than the prior art approaches and which can generate the "lemma" of a word (that is, its base form) as well as all the conjugations or linguistic forms that can be derived from the lemma.

It is a further object of the invention to provide an improved computer method to associate grammatical information to classify word forms which are input or generated.

It is another object of the invention to encode the ending tables in such a way that they are an integral part of the representation of the dictionary and provide significant compaction and speed over the prior art.

SUMMARY OF THE INVENTION

A computer method is disclosed for analyzing text by employing a model known as a paradigm, that provides all the inflectional forms of a word. A file structure is created consisting of two components, a list of words (a dictionary), each word of which is associated with a set of paradigm references, and the file of paradigms consisting of grammatical categories paired with their corresponding ending or affix portions (known as the desinence) specifying tense, mood, number, gender or other linguistic attribute. A computer method is disclosed for generating the file structure of the dictionary by generating all forms of the words from a list of standard forms of the words (known as the lemma) which is generally the infinitive of a verb or the singular form of a noun, the lemmas being generated with their corresponding paradigms. The method sorts and organizes the resulting word list into a dictionary. An input data stream of natural language words can then be processed by generating a lemma for each input word. This is done by matching the input word against the dictionary and using the resulting paradigm references to access a set of paradigms. Then the ending or affix (desinence) of the paradigm is matched against the input word and the corresponding grammatical category for each matched desinence is recorded and the standard form of the word (the lemma) is generated by replacing the matching desinence of the input word with the desinence of the lemma. The specific grammatical form of an input word can be generated from the standard form of the word (the lemma) and the grammatical category, by matching the lemma against the dictionary and using its paradigm references to access a set of paradigms. Then the desinences of the paradigms are matched against the lemma and the desinence corresponding to the specified grammatical category is selected. The specific grammatical form is generated by replacing the desinence of the lemma with the desinence of the desired grammatical form. The computer method disclosed can be applied to compact dictionary representation, grammatical analysis, automatic indexing, synonym retrieval, and other computational linguistic applications. It is shown that incorporation of the paradigms as an integral representation of the dictionary results in efficient access to the grammatical information associated with the desinences, since traversal of the paradigms is equivalent to scanning the dictionary.

BRIEF DESCRIPTION OF THE DRAWINGS

These and other objects, features and advantages of the invention will be more fully appreciated with reference to the accompanying figures.

FIG. 4 is a representation of an English irregular verb paradigm.

FIG. 5 is a representation of a Spanish regular verb paradigm.

FIG. 6 is a representation of a Spanish regular noun paradigm.

FIG. 8 is a representation of a regular verb paradigm.

FIG. 9 is a representation of a paradigm for regular verbs ending in "ed."

DESCRIPTION OF THE BEST MODE FOR CARRYING OUT THE INVENTION

Figures 1, 2, 3:
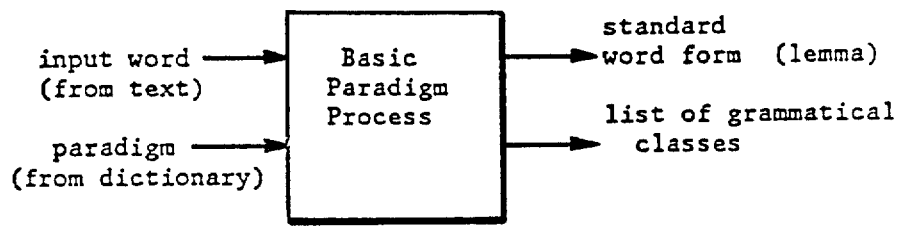
FIG. 1 is a functional block diagram of the basic paradigm process.
FIG. 2 is a representation of an English regular verb paradigm.
FIG. 3 is a representation of an English regular noun paradigm.

A paradigm is a model that shows all the forms that are possible for a word. This may include all forms that can be generated by suffixation as well as those that can be generated by prefixation. In this document a distinction is made between a "basic paradigm process" that may be used to generate a standard word form (or lemma) from any form of the word, and a "generative paradigm process" that can be used to generate all word forms from the lemma and the paradigm. The basic paradigm process is illustrated in FIG. 1. An input word is processed against a reference paradigm to produce a standard word form (or lemma) and a list of grammatical categories.

FIG. 2 is a paradigm used for many regular English verbs and FIG. 3 is a paradigm for regular English nouns. The grammatical classes are given in the left column, and the morphological characteristics (desinences) are indicated in the right column. In addition, the heading of the paradigm contains an identifying number and an example. The basic paradigm process consists of matching the desinences of the paradigm against an input word (to which the particular paradigm is applicable).

The basic paradigm process is applied as follows: Given an input word such as "books" and a reference paradigm number "N27" (FIG. 3), we match the desinences of the paradigm against the word. In this example, the final "s" matches, indicating that the input word is a plural noun; this information is placed in the list of grammatical classes. The lemma is generated by replacing the "s" with a blank (represented in the paradigm table as an underscore). The resulting lemma is "book" which is the singular form of the noun.

If we apply paradigm number "V45" (FIG. 2) to the same input word, the basic paradigm process indicates that the word is the present tense of a verb applicable to the third person. This is illustrated in the sentence "He books a flight to Boston." The lemma is generated as for the previous example, but it corresponds to the infinitive form of the verb.

FIG. 4 illustrates a paradigm for an English irregular verb form. FIGS. 5 and 6 are paradigms for examples of Spanish regular verbs and Spanish regular nouns. Although the morphology for Spanish is more complicated, the same basic procedure described above is used.

The replacement mechanism used to generate the lemma is very general. It is applicable even for cases where complete word replacement is required because no morphological features are shared (as in the forms of the verb "be:" be, am, is, etc.).

ASSOCIATION OF PARADIGM REFERENCES WITH WORDS

The preceding section illustrated the basic paradigm process to produce the lemma. This section presents the methodology of the generative paradigm process which is used to produce all word forms from a lemma and a paradigm; this is the basis for building a dictionary of word forms and their corresponding paradigm reference.

Figure 7:
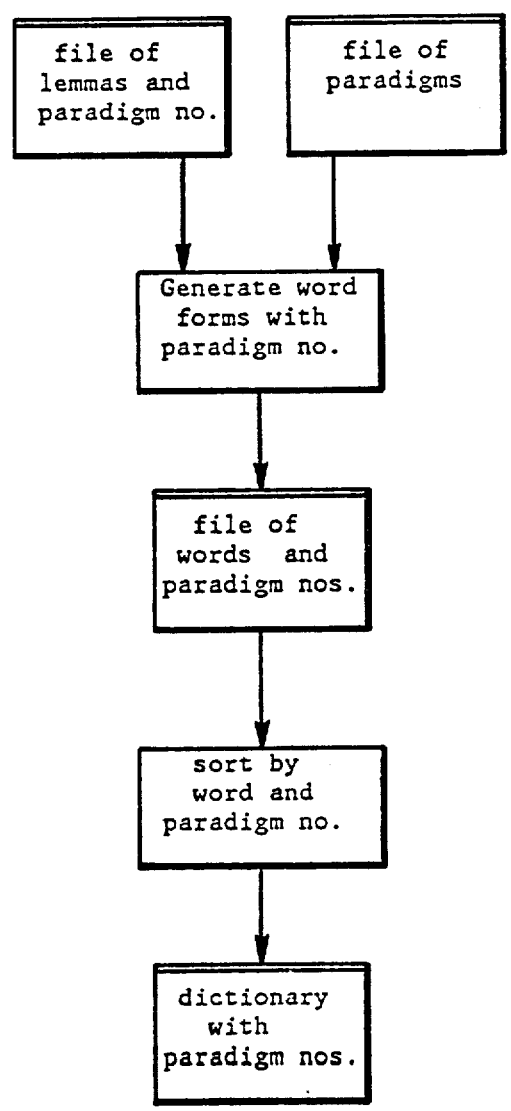
FIG. 7 is a functional block diagram illustrating the association of paradigm numbers with word forms.

FIG. 7 illustrates how a file of lemmas and their corresponding paradigm numbers (references) can be processed against a file containing the paradigms to produce a file of words and paradigm numbers. After sorting and removing duplicates, this file can be used as a reference dictionary against which vocabulary from any text can be matched to retrieve the paradigm numbers. It is then possible to obtain the lemma for each text word by application of the basic paradigm procedure.

The details of the generative procedures are the same as for the basic procedure, but rather than having to scan all the morphological entries in the paradigm for a match, only the morphology of the lemma is examined to identify the linguistic stem to which the rest of the morphological features apply to generate the word forms. As an example, the lemma "grind" and the paradigm number "V4c" (illustrates in FIG. 4) results in the linguistic stem "gr" from which the unique entries "grind," "grinding," "ground," and "grinds" can be generated. Processing of the lemma "ground" and the paradigm "N27" (FIG. 3) results in the entries "ground" and "grounds."

The resulting dictionary with paradigm numbers would have the following entries, and the asterisk (*) indicates the lemma. This dictionary, by the way, can be used for other word processing functions such as spelling error detection and correction, even though it contains the additional information.

grind V4c*
grinding V4c
grinds V4c
ground V4c, N27*
grounds N27

DEFINITION OF PARADIGMS TO AVOID DECODING AMBIGUITIES

It does not follow that because all the word forms are generated properly from a lemma and a paradigm, the lemma can be generated from any word form. It is important to define judiciously the paradigms that apply to specific lemmas to obtain this symmetry of function.

FIG. 8 illustrates a paradigm applicable to many regular English verbs such as "talk," "paint," and "remind" which end in consonants. On the left side of the paradigm is the definition of the endings (underscore indicates blank), and on the right side the corresponding grammatical categories are listed (where the numbers 1 through 3 apply to the singular person of the present tense and 4 through 6 to the corresponding plural person).

Application of this paradigm to lemmas that end in the same substrings that define the lemma can cause problems during the decoding stage. Let us say that we apply this paradigm to a word like "speed." There are no problems during generation of the words from the lemma, but during decoding the words "speeded" and "speed" will match against "ed" giving the lemma "speed" in the first case and an incorrect stem "spe" in the second.

This problem can be corrected by: (1) recognizing the situation, and (2) defining a new paradigm with longer substrings in the paradigm. These are created by adding letters to the desinences from the end of the lemma for which the problem occurs. A paradigm that resolves this problem is illustrated in FIG. 9. This paradigm applies to verbs whose lemma ends in "ed" such as "speed," "seed," "need," etc.

APPLICATIONS OF PARADIGM-BASED TEXT ANALYSIS

Compact Dictionary Representation.

A list of lemmas and their corresponding paradigms is a compact way of representing a dictionary. This is particularly advantageous for languages that have verbs with a large number of declensions. This invention represents a dictionary as a set of lemmas and their corresponding paradigms.

Grammatical Analysis.

The information obtained as part of the basic paradigm process contains grammatical information that not only identifies the part of speech, but also gives the grammatical roles of the words. This makes it possible to use the paradigm procedure for grammar checking tasks such as subject/verb agreement, article/noun agreement, and other gender, number, and verb-form agreement tasks.

Automatic Indexing.

The lemma obtained from the basic paradigm process can be used as an index point for natural language text which is independent of the word forms encountered in the text. Similarly, retrieval becomes easier when only the lemmas need to be searched without needing to cope with the uncertainties in vocabulary in unrestricted natural language text.

As an additional option, a data base query may be expanded by generating the plural forms of the query terms (through the paradigm process); this will improve recall when searching data bases.

Synonym Retrieval.

Figure 10:
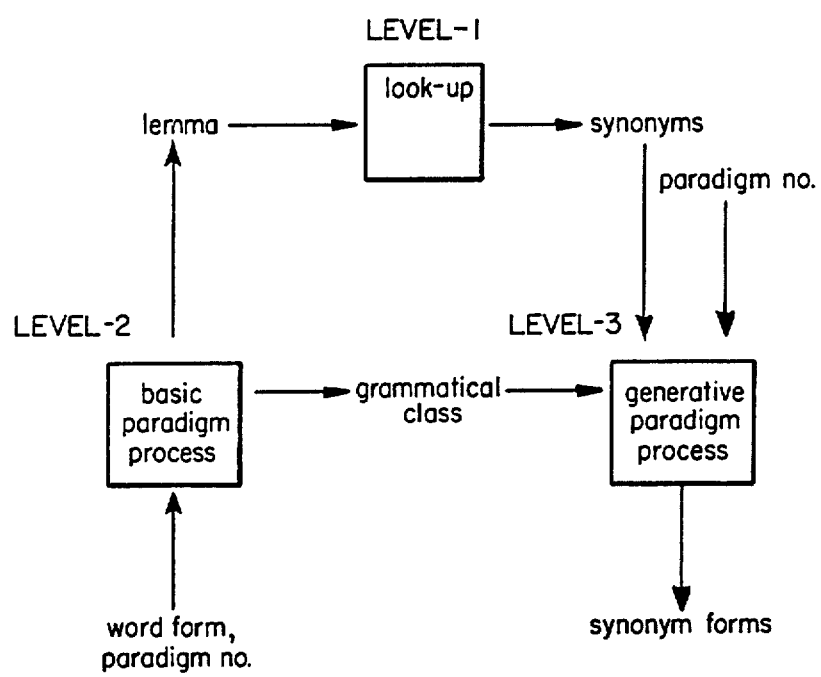
FIG. 10 illustrates the levels of synonym support.

FIG. 10 illustrates three levels of synonym support which are possible using the basic and generative paradigm processes. Level-1, which is the most fundamental level is a traditional look-up based on the lemma. This is how a manual or unassisted synonym support process works. A person has to provide the lemma.

Level-2 uses the basic paradigm process to convert text words automatically to the lemma. This makes it possible to reference a synonym dictionary automatically in a text-processing task by simply positioning a cursor on a word and pressing a function key. The synonyms retrieved are those that would be found in a synonym dictionary in lemma form.

Level-3 refines the output of the synonym dictionary by generating the forms of the synonym that correspond to the input word. At this stage the user of a text processing system only needs to select a word form to replace it in the text.

THE PARADIGM TABLES AS A COMPACT DICTIONARY

FIG. 7 presented a method for associating paradigm numbers with the entries of a dictionary in alphabetical sequence. However, there are many applications for which strict alphabetical sequence is not necessary. In spelling verification, for example, it is sufficient if a dictionary is ordered in roughly alphabetic sequence, that is, so that the first three letters (or any arbitrary number of letters) of the words are in alphabetic sequence. The program that compares the input word against the dictionary scans only the section of the dictionary which has the same first three letters. By increasing the number of initial letters which are in alphabetic sequence the portion of the dictionary which has to be scanned can be reduced so that the time for scanning meets any desired requirements.

It is evident that all the words of a dictionary can be represented by a list of lemmas and their associated paradigms. By adding the words which have no paradigms (e.g., the prepositions "at," "for," and other function words) the word list can be made complete. If we order the lemmas in alphabetical order, the "roughly alphabetic" sequence criterion is not met in many cases. For example, the word "go" is associated with "goes," "going," "gone" and "went." Clearly, "went" is alphabetically very far from "go" and it is necessary to create a cross-reference entry to maintain an alphabetical sequence with the desired degree of order. Thus, a compact dictionary where the first two letters of all the words represented are in alphabetic sequence, might look like:

| Word | Paradigm | Words Represented |
| --- | --- | --- |
| at | 0 | at |
| go | V4 | go, went, gone goes, going |
| goad | V56 | goad, goaded, goads, goading |
| goat | N27 | goat, goats |
| gobble | V71 | gobble, gobbled, gobbles, gobbling |
| went | @V4 | went (cross-reference entry for paradigm V4) |

In this example, the lemmas are associated with their corresponding paradigms or "0" if they have none. The entry for "went" is placed in alphabetical sequence with its associated paradigm number, but the "@" indicates that it is a cross-reference rather than a lemma. The paradigms are given here in their symbolic representation. In the actual dictionary, they would be encoded as binary numbers identifying the paradigm tables. There may be more than one paradigm per entry and in some cases it will be necessary to continue scanning after a match has been found to obtain all relevant matches. For example, the word "types" will be found as the third person form of the verb and as the plural of the noun; two different paradigms have to be scanned.

The dictionary can be further compacted by front encoding. This is a technique which specifies a count indicating how many leading characters are the same as the previous entry. Thus, "goad" would be coded as "2ad" since the first two characters are the same as the word "go" which precedes it; "goat" would be coded as "3t" since three leading characters are the same as the preceding word. If there are no characters in common with the preceding word, the count is omitted. The front-encoded dictionary might look like:

at 0
go V4
2ad V56
3t N27
2bble V71
went @V4

Features to Speed up Matching

Thus far, a paradigm has been described as consisting of a set of desinences (endings) associated with grammatical categories. The paradigm reference number itself provides information about part of speech since it identifies a verb model, noun model, etc. Additional information may be added to the paradigms to speed up access to a compact dictionary based on paradigms. Length screens and content screens are particularly useful. A length screen indicates the minimum and maximum length of the words generated by a paradigm and can be used to avoid scanning the paradigm for possible matches when there can be none. As an example, let us say that we are looking for the word "gobbles" in the dictionary. Since "gobbles" starts with the substring "go," it would be reasonable to check paradigm V4 associated with "go" to see if it generates the word "gobbles." A length screen would prevent this futile exploration. All that is needed is to indicate in each paradigm the minimum and maximum length of the words generated by the paradigm and the length of the longest desinence. Since the longest word generated by paradigm V4 contains five characters and since "gobbles" is longer, we can deduce that the word cannot possibly match and there is no need to examine the paradigm further.

Similarly, a content screen gives an indication of the characters contained in the desinences. If the word to be matched contains some characters which are not in the content screen, the match will fail and there is no need to go further. Both length and content screens can be combined for efficient use of the paradigms as a compact dictionary representation.

Although a specific embodiment of the invention has been disclosed, it will be understood by those having skill in the art that minor changes can be made to the disclosed embodiment without departing from the spirit and the scope of the invention.

What is claimed is:

1. In a computer system, a method for generating a file structure for enabling paradigm-based morphological text analysis upon words in an input word stream of natural language text, the computer system including a memory, comprising the steps of:

compiling in said computer system from a starting list of lemmas associated with their corresponding paradigm references, a list of all the word forms generated by each lemma and its paradigm and associating each word form with its paradigm reference;

ordering in said computer system said compiled list of word forms and paradigm references in any desired collating sequence;

consolidating in said computer system duplicate word entries generated from multiple lemma and paradign combinations and compiling a file structure of unique word forms, each of which is associated with a list of paradigm references, and a list of paradigm tables which may be accessed by these references.

2. A computer method for matching in a computer system an input word against a dictionary structured as a list of lemmas and their associated paradigms, comprising the steps of:

selecting in said computer system a set of entries in said dictionary to scan based on the collating sequence of the input word;

testing in said computer system the input word against paradigm screens to avoid useless comparisons if a dictionary entry has an associated paradigm;

comparing in said computer system the input word against the words generated by application of the paradigm to the dictionary entry and retrieving associated grammatical information when there is a match.

3. A computer method for matching in a computer system an input word against a dictionary structured as a list of lemmas and their associated paradigms, comprising the steps of:

selecting in said computer system a set of lemmas to scan;

testing in said computer system the input word against its associated paradigm;

comparing in said computer system the input word against the words generated by application of the paradigm to the lemma and retrieving associated grammatical information when there is a match.

4. A computer method for generating in a computer system the lemma of a word from a file structure consisting of two components, the first component being a dictionary list of words, each word of which is associated with a set of paradigm references and the second component being a file of paradigm consisting of grammatical categories paired with their corresponding desinences, comprising:

matching in said computer system the input word against said dictionary;

accessing in said computer system from said file of paradigms a set of paradigms using the paradigm references from the matched word found in said dictionary;

matching in said computer system the desinences of the paradigm corresponding to the matched word, against the input word;

recording in said computer system the grammatical categories corresponding to each matching desinence and generating the lemma by replacing the matching desinence of the input word with the desinence of the lemma.

5. A method for generating in a computer system a specific grammatical form of a word from the lemma and the grammatical category, using a file structure consisting of two components, the first component being a dictionary list of words, each word of which is associated with a set of paradigm references and the second component being a file of paradigms consisting of grammatical categories paired with their corresponding desinences, comprising:

matching in said computer system the lemma against said dictionary;

accessing in said computer system a set of paradigms from said file of paradigms corresponding to the paradigm reference of the matched lemma;

matching in said computer system the desinences of the paradigm against the lemma;

selecting in said computer system the desinence corresponding to the specified grammatical category and generating the specific grammatical form by replacing the desinence of the lemma with the desinence of the desired grammatical form.

* * * * *